United States Patent
Chen et al.

(10) Patent No.: US 8,493,915 B2
(45) Date of Patent: Jul. 23, 2013

(54) METHOD FOR SYNCHRONIZING BETWEEN A GATEWAY AND BASE STATIONS AND CORRESPONDING GATEWAY AND BASE STATIONS

(75) Inventors: Yu Chen, Shanghai (CN); Dietrich Zeller, Paris (FR)

(73) Assignee: Alcatel Lucent, Paris (FR)

( * ) Notice: Subject to any disclaimer, the term of this patent is extended or adjusted under 35 U.S.C. 154(b) by 294 days.

(21) Appl. No.: 12/935,834

(22) PCT Filed: Mar. 31, 2008

(86) PCT No.: PCT/CN2008/000641
§ 371 (c)(1),
(2), (4) Date: Sep. 30, 2010

(87) PCT Pub. No.: WO2009/121204
PCT Pub. Date: Oct. 8, 2009

(65) Prior Publication Data
US 2011/0026464 A1  Feb. 3, 2011

(51) Int. Cl.
*H04W 4/00* (2009.01)
(52) U.S. Cl.
USPC .......................................................... 370/328
(58) Field of Classification Search
USPC .............. 370/328, 310.1, 312, 349, 410, 331, 370/392, 471, 503, 507, 512, 324, 329, 338, 370/350, 395.3; 455/502, 509
See application file for complete search history.

(56) References Cited

U.S. PATENT DOCUMENTS

| | | | | |
|---|---|---|---|---|
| 5,388,102 | A | * | 2/1995 | Griffith et al. ................. 370/512 |
| 7,738,505 | B2 | * | 6/2010 | Chang ........................... 370/507 |
| 8,189,531 | B2 | * | 5/2012 | Watanabe et al. ............. 370/331 |
| 2005/0058090 | A1 | | 3/2005 | Chang |
| 2005/0094618 | A1 | | 5/2005 | Colban |

FOREIGN PATENT DOCUMENTS

| | | |
|---|---|---|
| CN | 1943138 A | 4/2006 |
| CN | 101039175 A | 9/2007 |
| CN | 101132222 A | 2/2008 |
| WO | WO2008024214 A2 | 2/2008 |

OTHER PUBLICATIONS

"Details of eMBMS Content Synchronization", 3GPP TSG-RAN WG3 #55; R3-070220, St. Louis, Missouri, Feb. 12-16, 2007, pp. 1-8.
"MBSFN Scheduling and Content Synchronization", 3GPP TSG-RAN WG3 Meeting #57bis, R3-071920, Sophia Antipoli, France, Oct. 8-11, 2007.
European Search Report dated Jan. 18, 2013.

* cited by examiner

*Primary Examiner* — Chi Pham
*Assistant Examiner* — Alexander O Boakye
(74) *Attorney, Agent, or Firm* — Fay Sharpe LLP

(57) ABSTRACT

A method for synchronizing between an access gateway and a plurality of base stations is provided. The method comprises: at the gateway, determining a synchronization period corresponding to a packet to be transmitted to the base stations, said synchronization period being used as a scheduling granularity of the base stations, adding information indicating the synchronization period to the header of the packet, and transmitting the packet to the corresponding base stations; and at each of the base stations, obtaining, upon receipt of the packet, the synchronization period corresponding to the packet based on the information in the header of the packet, storing the packet in a buffer, determining, at the time of scheduling, synchronization periods which have terminated before the time of scheduling based on the synchronization periods corresponding to the stored packets, and scheduling packets corresponding to the determined synchronization periods according to a predetermined scheduling strategy.

17 Claims, 6 Drawing Sheets

METHOD FOR SYNCHRONIZING BETWEEN A GATEWAY AND BASE STATIONS AND CORRESPONDING GATEWAY AND BASE STATIONS

FIELD OF THE INVENTION

The present invention relates to synchronization technology in mobile communication, and more particularly, to a method for synchronizing between a gateway and a plurality of base stations and corresponding gateway and base station.

BACKGROUND OF THE INVENTION

In 2005, 3GPP (The 3rd Generation Partnership Project) launched the Long Term Evolution (LTE) research project which is intended to provide support for increasingly growing demands from operators and users by a higher data throughput and a better network performance.

Multimedia Broadcast/Multicast Service (MBMS) is a service introduced by 3GPP Rel 6, which refers to a point-to-multipoint service in which one data source transmits data to multiple users, so that network (including core network and access network) resource sharing can be achieved. In this way, services for as many as possible users having the same demand can be satisfied by using resources as few as possible. In a wireless access network, by utilizing common transmission channels and common radio bearers, MBMS enables multicast and broadcast of not only low rate plain-text message, but also high rate multimedia service, such as mobile TV.

Various researches on Evolved MBMS (EMBMS) are currently ongoing.

In 3GPP LTE, the core network employs a two-layer flat network architecture in which four major network elements at the original WCDMA/HSDPA stage, i.e., NodeB, RNC, SGSN and GGSN, are evolved into two major network elements, i.e., eNodeB (eNB, evolved NodeB, referred to as "base station" hereinafter) and access gateway (GW). Further, the core network utilizes an all-IP distributed structure to support IMS, VoIP, SIP, Mobile IP, etc.

FIG. 1 illustrates the structure of an LTE network. An access gateway, GW, receives data from a Broadcast Multicast Service Center (BM-SC). The access gateway GW is connected with a plurality of base stations eNB1, eNB2 and eNB3. The user plane interface between the access gateway GW and one of the base stations is referred to as M1 interface. The plurality of base stations (eNBs) is connected to one another in a mesh form (indicated by dashed line in FIG. 1). The interface between two of the base stations is referred to as X2 interface. A plurality of user equipments (UEs), UE 11~UE 12, UE 21~UE 23 and UE 31~UE 33, are illustratively shown in the cells serviced by the base stations eNB1-eNB3, respectively.

In LTE, the downlink transmission scheme at the physical layer of the wireless interface is OFDM scheme, and the uplink transmission scheme is SC-FDMA scheme. Due to the OFDM mechanism, the same wireless signals from different cells can be spontaneously combined in the air to improve signal strength, such that Radio Frequency (RF) combining can be performed without additional processing overhead.

Thus, as for EMBMS in LTE, it has been defined as a baseline requirement to support RF combining in the air in the Single Frequency Network (SFN) multi-cell transmission mode, so as to improve the gain at the border of the cell, since EMBMS needs to transmit the same service data to several different users.

In SFN, base stations (eNBs) have been synchronized in terms of frame timing at the physical layer, and the accuracy of the synchronization can satisfy the requirement for EMBMS RF combining. However, in order to ensure the effectiveness of RF combining, the wireless signals to be combined have to be kept synchronous with and consistent with one another in terms of MBMS service content. That is, the transmission synchronization at Layer 2 (L2) needs to be guaranteed for multi-cell transmission of MBMS service.

Further, in the LTE network architecture, IP multicast transmission has been design to extend to the base station eNB. With IP multicast, an MBMS service packet can be transmitted to a group of base stations (eNBs) at a time. The current routing protocol for IP multicast specifies that the route from each base station eNB to an access gateway GW mainly depends on the current network topology and remains unchanged unless a related router fails (which rarely happens). In addition, the processing capabilities of the routers in the network as well as the transmission load of the network will be optimized during network optimization. Thus, the major factor affecting different transmission delays over different transmission paths from different base stations eNBs to the access gateway GW generally consists only in the difference of the transmission paths. In other words, while the base stations (eNBs) in an SFN area have been synchronized in terms of frame timing at the physical layer, the same MBMS data packet may arrive at different base stations (eNBs) at different timings due to the different routes.

FIG. 2 is a schematic diagram illustrating delays for the same data packet transmitted from the same access gateway to different base stations. As shown in FIG. 2, the data packet is transmitted from the access gateway GW to the base station eNB 1 via a route of access gateway GW➔ router R1➔ base station eNB 1. On the other hand, the data packet is transmitted from the access gateway GW to the base station eNB2 via a route of: access gateway GW➔ router R2➔ router R3 ➔ base station eNB2. The different routes via which the same data packet are transmitted will necessarily cause different delays.

As shown in FIG. 2, the data packet is transmitted from the access gateway GW to the base stations eNB1 and eNB2 at $T_0$ simultaneously, but arrives at the base station eNB1 at $T_1$ and arrives at the base station eNB2 at $T_2$, respectively. In this case, the same data packet arrives at different base stations (eNBs) with a relative delay of TD $T_2-T_1$.

It can be seen from the above, if the base stations eNB1 and eNB2 hardly receive the data packets from the access gateway GW when they transmit these data packets out, it is obvious that the data packets having the same content will be transmitted to user equipments UEs from different base stations (eNBs) asynchronously. As a necessary result, these data packets cannot be correctly combined or even introduce additional interference. Moreover, after the arrival of the same data packet, each base station eNB needs to perform processes (such as segmentation, encoding, modulation and framing, etc.) on the packet. In this case, inconsistent timing of framing processes will affect the RF combing of these data.

Therefore, a method for storing received data in a buffer for a period before scheduling is employed in the prior art to satisfy the requirement for the SFN that a number of base stations should transmit signals having the same content simultaneously at the same frequency. For example, if a packet is transmitted from a gateway to two base stations simultaneously with the time at which it arrives at these two base stations being 7:55 and 8:01, respectively, then each of these base stations stores the received packet and transmits it at a later time (at 8:30, for example). In this way, it can be ensured that the base stations transmit the packets with the same content at the same time.

The above illustrative example is intended to explain the method for satisfying SFN requirement in the prior art. That is, the base station stores received data in a buffer and performs scheduling, after a certain period, in a first in first out manner by extracting data at the head of a queue (the data first entering the buffer). In this way, the synchronization between data contents extracted at the same time by different base stations can be ensured.

With the development of communication technology and the research of 3G standards, however, there is a new requirement for service multiplexing. That is, a number of EMBMS services dynamically share the same time-frequency resource block and the portions of the same time-frequency resource block occupied by individual services are allocated by individual base stations independently. Meanwhile, in order to satisfy the requirement for SFN, the resource allocations for the individual services have to be consistent among the respective base stations. To satisfy the above requirement for multiplexing, 3GPP introduces a concept of scheduling period. Each base station has a synchronized scheduling period within which resources are shared with other base stations. The base station schedules once for one scheduling period. When scheduling, the base station allocates corresponding resources to the individual services based on buffered data, available shared resources and a particular scheduling algorithm.

With respect to the requirements for service multiplexing and synchronization, the above prior art solution has the following drawbacks.

As noted above, due to various network delays and other delays, the same data packet transmitted from the gateway arrives at respective base stations at different time. Although the prior art solution can guarantee the synchronization between the data at the respective heads of the buffered queues in corresponding base stations, the synchronization between the respective service data received by the base stations cannot be guaranteed.

For example, if there are 100 bits of data for service A buffered in a base station and 200 bits of data for service A buffered in another base station, it will be difficult to synchronize the resource allocations for the data of service A between these two base stations. In other words, the above requirements for service multiplexing and synchronization cannot be satisfied.

SUMMARY OF THE INVENTION

The present invention is made in view of the above problems. An object of the present invention is to provide a method for synchronizing between a gateway and a plurality of base stations and corresponding gateway and base station, capable of ensuring synchronization between respective service data received by the base stations, such that the requirements for service multiplexing and synchronization can be satisfied.

According to an aspect of the present invention, a method for synchronizing between an access gateway and a plurality of base stations is provided, which comprises the following steps of: at the gateway, determining a synchronization period corresponding to a packet to be transmitted to the plurality of base stations, said synchronization period being used as a scheduling granularity of the base stations; adding information indicating the synchronization period to the header of the packet; and transmitting the packet to the plurality of corresponding base stations; and, at each of the plurality of base stations, obtaining, upon receipt of the packet, the synchronization period corresponding to the packet based on the information in the header of the packet; storing the packet in a buffer; determining, at the time of scheduling, synchronization periods which have terminated before the time of scheduling based on the synchronization periods corresponding to the stored packets; and scheduling packets corresponding to the determined synchronization periods according to a predetermined scheduling strategy.

In the above solution, it is required to determine whether all the data in the previous synchronization period have been received and how many data are lost, based on a list for byte count and packet count carried by the current packet. In this way, the synchronization of scheduling can be maintained, even if some of the data in a certain synchronization period are lost, as long as the number of lost bytes and data packets is known. Thus, the criterion for deciding the feasibility of scheduling a certain synchronization period is to determine whether this synchronization period has terminated before the time of scheduling. Since the synchronization periods at the gateway and the base stations are synchronous, it is simple for the base stations to know whether a certain synchronization period has terminated before scheduling based on the end time of the synchronization period plus a pre-estimated margin.

Preferably, in the above solution, the method may further comprise a step of: setting, at the gateway and each of the plurality of base stations, a sequence of synchronization periods in advance based on the same time reference.

Preferably, in the above solution, the step of adding information indicating the synchronization period to the header of the packet may comprise: adding, if the packet is the first packet in a burst, to the header of the packet a timestamp identifying the synchronization period corresponding to the time at which the packet is received and information identifying an accumulative count of the synchronization period to which the packet in the burst belongs and all of the previous synchronization periods of the same burst; or adding, if the packet is not the first packet in a burst, to the header of the packet a timestamp corresponding to the first packet in the burst to which the packet belongs and information identifying an accumulative count of the synchronization period to which the packet in the burst belongs and all of the previous synchronization periods of the same burst.

Preferably, in the above solution, the step of adding to the header of the packet a timestamp identifying the synchronization period corresponding to the time at which the packet is received may comprise: adding the time at which the packet is received and a predetermined estimate of delay; determining a corresponding synchronization period based on the addition result; and adding to the header of the packet a timestamp identifying the determined synchronization period.

Preferably, in the above solution, the step of obtaining the synchronization period corresponding to the packet based on the information in the header of the packet may comprise: determining the synchronization period corresponding to the first packet in the burst to which the packet belongs, based on the timestamp contained in the header of the packet; and determining the synchronization period corresponding to the packet, based on the determined synchronization period corresponding to the first packet and the information contained in the header of the packet identifying the accumulative count of the synchronization periods corresponding to the burst.

Preferably, in the above solution, the information indicating the synchronization period may comprise information indicating the sequence number of the synchronization period in the sequence of synchronization periods set in advance.

Preferably, in the above solution, the step of determining a synchronization period terminated before the scheduling based on the synchronization period corresponding to the stored packet may comprise: determining, based on the sequence numbers of the synchronization periods corresponding to the stored packets, a synchronization period having the largest sequence number among the synchronization periods which have terminated before the time obtained by subtracting the predetermined estimate of delay from the time of scheduling, with the determined synchronization period and its preceding synchronization periods being the synchronization periods which have terminated before the time of scheduling.

Preferably, in the above solution, the method may further comprise the following steps of: at the gateway, pre-configuring information indicating the maximum allowable number of synchronization periods corresponding to each burst; and dividing, based on the information, a burst with a duration exceeding the maximum number of synchronization periods into two or more bursts.

Preferably, in the above solution, the method may further comprise the following steps of: at the gateway, constructing and transmitting a dummy packet without payload to the plurality of base stations if the packet to be transmitted to the plurality of base stations has not been received within a predetermined period; and at each of the plurality of base stations, determining, upon receipt of the packet, termination of the previously received burst based on the timestamp contained in the packet.

According to another aspect of the present invention, a gateway is provided, which comprises: a receiving means for receiving a packet to be transmitted to a plurality of base stations; a processing means for determining a synchronization period corresponding to the packet received by the receiving means and adding information indicating the synchronization period to the header of the packet, said synchronization period being used as a scheduling granularity of the base stations; and a transmitting means for transmitting the packet processed by the processing means to the plurality of base stations.

Preferably, in the above solution, the gateway may further comprise: a setting means for setting a sequence of synchronization periods in advance based on the same time reference as that for the plurality of base stations.

Preferably, in the above solution, the processing means may add to the header of the packet a timestamp corresponding to the first packet in a burst to which the packet belongs and information identifying an accumulative count of the synchronization period to which the packet of the burst belongs and all of the previous synchronization periods of the same burst, wherein the timestamp indicates the synchronization period corresponding to the time at which the first packet is received.

Preferably, in the above solution, the gateway may further comprise a dividing means for dividing, based on pre-configured information indicating the maximum allowable number of synchronization periods corresponding to each burst, a burst received by the receiving means and having a duration exceeding the maximum number of synchronization periods.

Preferably, in the above solution, the gateway may further comprise a dummy packet transmitting means for constructing and transmitting a dummy packet without payload to the plurality of base stations if the packet to be transmitted to the plurality of base stations has not been received within a predetermined period.

According a further aspect of the present invention, a base station is provided, which comprises: a buffer for storing packets; a receiving means for receiving packets from a gateway; a processing means for obtaining synchronization periods corresponding to the packets received by the receiving means based on information in the headers of the packets and storing the packets in the buffer; and a scheduling means for determining, at the time of scheduling, synchronization periods which have terminated before the time of scheduling based on the synchronization periods corresponding to the packets stored in the buffer, and for scheduling and transmitting packets corresponding to the determined synchronization periods according to a predetermined scheduling strategy.

Preferably, in the above solution, the base station may further comprise a setting means for setting a sequence of synchronization periods in advance based on the same time reference as that for the gateway.

Preferably, in the above solution, the processing means may determine the synchronization period corresponding to the first packet in a burst to which the packet belongs based on a timestamp contained in the header of the packet and determine the synchronization period corresponding to the packet based on the determined synchronization period corresponding to the first packet and information contained in the header of the packet identifying an accumulative count of the synchronization period to which the packet in the burst belongs and all of the previous synchronization periods of the same burst.

Preferably, in the above solution, the scheduling means may determine, based on sequence numbers of the synchronization periods corresponding to the stored packets, a synchronization period having the largest sequence number among the synchronization periods which have terminated before the time obtained by subtracting a predetermined estimate of delay from the time of scheduling, with the determined synchronization period and its preceding synchronization periods being the synchronization periods which have terminated before the time of scheduling.

Preferably, in the above solution, the scheduling means can clear all the untransmitted data of the previous bursts stored in the buffer before scheduling a packet in a new burst.

At least one of the above solutions can achieve the synchronization between the respective service data received by the individual base stations by changing the scheduling granularity. The problem with the prior art as stated above consists in that the scheduling granularity is too small, e.g., one data packet or one frame (10 ms), which tends to introduce uncertainty. With the solution of at least one aspect according to the present invention, a concept of synchronization period is introduced at both the gateway side and the base station side, such that both sides can determine the received data based on the same synchronization period. In this way, the individual base stations can determine the border of the received data to be scheduled based on the same synchronization period. That is, the synchronization period, e.g., 320 ms, can be used as the same scheduling granularity among the respective base stations. Thus, it is easier to determine sequential relationship in time and how many synchronization periods of data are received, so that the synchronization between the respective service data received by the individual base stations can be achieved and the requirements for service multiplexing and synchronization can be satisfied.

BRIEF DESCRIPTION OF THE DRAWINGS

The above features and advantages of the present invention will be more apparent from the following detailed descriptions in conjunction with accompanying drawings, in which.

DETAILED DESCRIPTION OF THE PREFERRED EMBODIMENTS

The illustrative embodiments of the present invention will be further described in detail in the following with reference to accompanying drawings.

Figure 1:
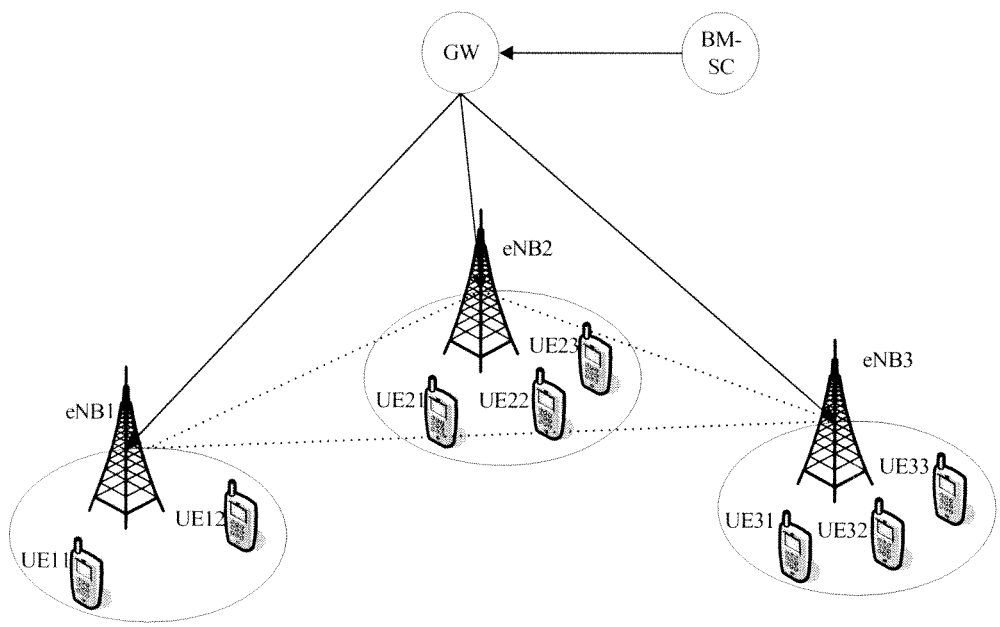
FIG. 1 shows the structure of an LTE network.
Figure 2:
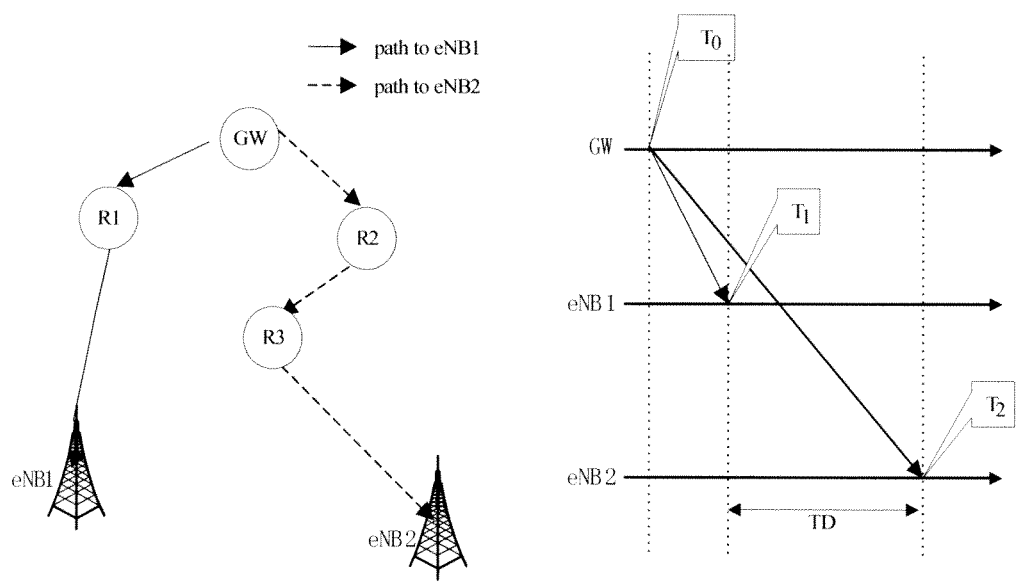
FIG. 2 is a schematic diagram illustrating delays for the same data packet transmitted from the same access gateway to different base stations.
Figure 3:
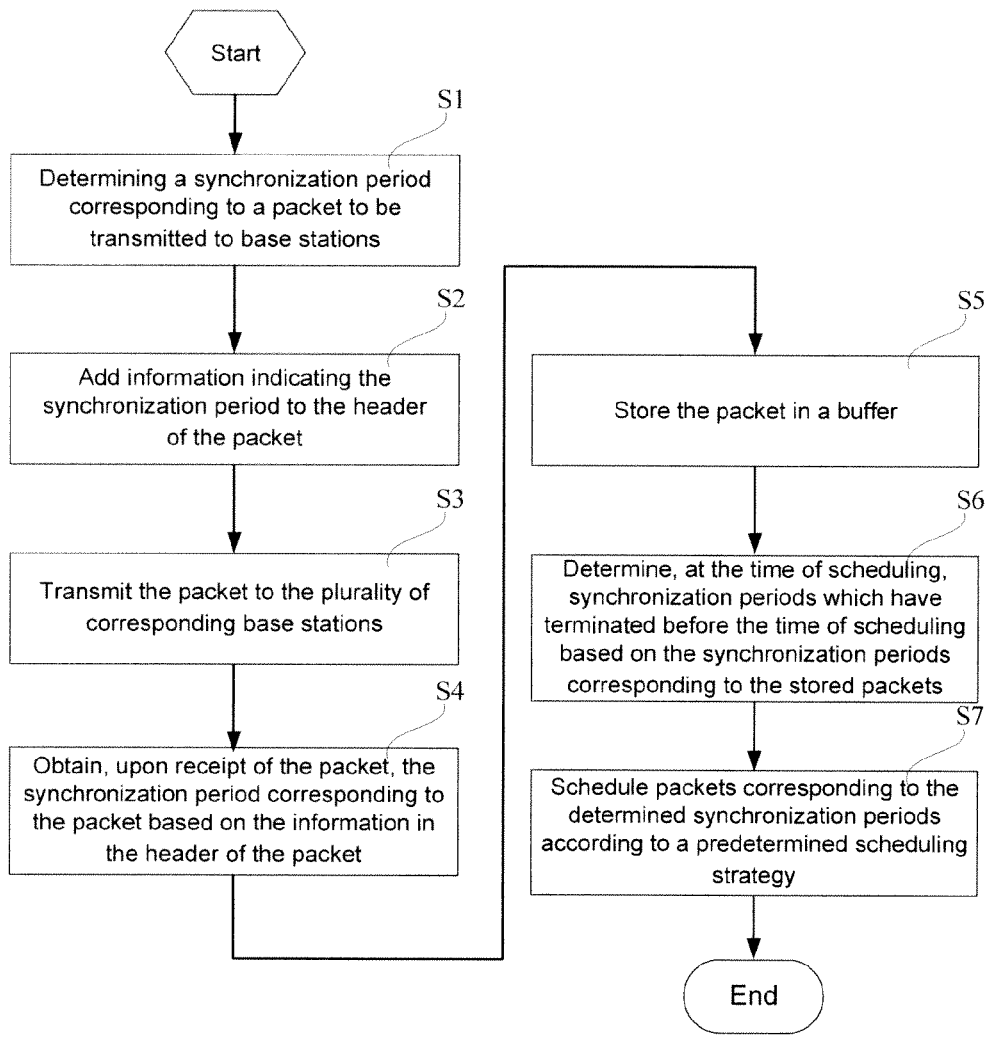
FIG. 3 is a flowchart showing the method for synchronizing between a gateway and a plurality of base stations according to the first embodiment of the present invention.

Reference is now made to FIG. 3, which is a flowchart showing the method for synchronizing between a gateway and a plurality of base stations according to the first embodiment of the present invention. As shown in FIG. 3, this embodiment comprises the following steps.

At the gateway, the following process is performed. Specifically, in step S1, a synchronization period corresponding to a packet to be transmitted to the plurality of base stations is determined and said synchronization period is used as a scheduling granularity of the base stations. Next, in step S2, information indicating the synchronization period is added to the header of the packet. Then, in step S3, the packet is transmitted to the plurality of corresponding base stations.

At each of the plurality of base stations, the following process is performed. Specifically, in step S4, upon receipt of the packet, the synchronization period corresponding to the packet is obtained based on the information in the header of the packet. Next, in step S5, the packet is stored in a buffer. Then, in step S6, at the time of scheduling, synchronization periods which have terminated are determined based on the synchronization periods corresponding to the stored packets. Finally in step S7, packets corresponding to the determined synchronization periods are scheduled according to a predetermined scheduling strategy.

According to the first embodiment, the synchronization between the respective service data received by the individual base stations can be maintained by changing the scheduling granularity.

The problem with the prior art as stated above consists in that the scheduling granularity is too small, e.g., one data packet or one frame (10 ms), which tends to introduce uncertainty. Although the prior art solution can guarantee the synchronization between the data at the respective heads of the buffered queues in corresponding base stations, it can not guarantee the synchronization between the respective service data received by corresponding base stations.

In contrast, according to the first embodiment, a concept of synchronization period is introduced at both the gateway side and the base station side, such that both sides can determine the border of the received data to be scheduled based on the same synchronization period. In this way, the respective service data can be scheduled by the individual base stations synchronously and the synchronization period, e.g., 320 ms, can be used as the scheduling granularity for all base stations. Thus, it is easier for the base station to determine sequential relationship in time and how many synchronization periods of data are received. In this way, not only the synchronization between the data at the respective heads of the buffered queues in corresponding base stations, but also the synchronization between the respective service data received by the individual base stations can be guaranteed by only scheduling the data corresponding to the synchronization period determined to have terminated, and thereby requirements for service multiplexing and synchronization can be satisfied.

Preferably, the above first embodiment further comprises a step of: setting, at the gateway and each of the plurality of base stations, a sequence of synchronization periods in advance based on the same time reference. In this way, the reference for synchronization period can be maintained consistent among the respective base stations.

Preferably, in the above first embodiment, the step of adding information indicating the synchronization period to the header of the packet may comprise:

adding, if the packet is the first packet in a burst, to the header of the packet a timestamp identifying the synchronization period corresponding to the time at which the packet is received and information identifying an accumulative count of the synchronization period to which the packet in the burst belongs and all of the previous synchronization periods of the same burst; or adding, if the packet is not the first in a burst, to the header of the packet a timestamp corresponding to the first packet in the burst to which the packet belongs and information identifying an accumulative count of the synchronization period to which the packet in the burst belongs and all of the previous synchronization periods of the same burst.

Two illustrative examples are given below, by means of example only, for the format of a Protocol Data Unit (PDU) to which the timestamp and the corresponding count information are added.

TABLE 1

| The first example | | | |
|---|---|---|---|
| Timestamp | Length of list | List of {byte count, packet count} | Payload/Non Payload |

In the above first example, the synchronization between the gateway and the base stations is performed based on the granularity of synchronization period. The packets in the same burst carry the same timestamp. The "length of list" field indicates the number of synchronization periods the burst has experienced, i.e., the length of the list of {byte count, packet count}. The "list of {byte count, packet count}" field indicates the counts of bytes and packets for each of the synchronization periods of the burst. It is obvious that:

the total byte count of the burst (up to now) the sum of all the byte counts in the list; and the total packet count of the burst (up to now)=the sum of all the packet counts in the list.

The timestamp of the above first embodiment is based on the granularity of synchronization period which is set at the user plane M1 interface between the gateway and the base station and is specific to each E-MBMS. An exemplary size of the synchronization period is 500 ms. A burst may contain one or more synchronization periods (SYNC periods).

TABLE 2

The second example

| Timestamp | List of {byte count, packet count, flag} | Payload/Non Payload |
|---|---|---|

In the above second example, the "list count" field in the first example is replaced with a flag. If the flag equals to 1, it indicates the existence of the next byte count and packet count; if the flag equals to 0, it indicates the end of the list.

The above first and second embodiments are intended for illustrative purpose only, rather than limiting the present invention. It can be appreciated by those skilled in the art that the specific format for the Protocol Data Unit (PDU) to which the timestamp and the corresponding count information are added may be flexibly set depending on the requirement of the actual application scenario. All the specific formats are intended to be encompassed by the scope of the present invention.

Preferably, in the above first embodiment, for taking into consideration the network delay, the step of adding to the header of the packet a timestamp identifying the synchronization period corresponding to the time at which the packet is received may comprise: adding the time at which the packet is received and a predetermined estimate of delay; determining a corresponding synchronization period based on the addition result; and adding to the header of the packet a timestamp identifying the determined synchronization period.

Preferably, in the above first embodiment, the step of obtaining the synchronization period corresponding to the packet based on the information in the header of the packet may comprise: determining the synchronization period corresponding to the first packet in the burst to which the packet belongs, based on the timestamp contained in the header of the packet; and determining the synchronization period corresponding to the packet, based on the determined synchronization period corresponding to the first packet and the information contained in the header of the packet identifying the accumulative count of the synchronization periods corresponding to the burst.

Preferably, in the above first embodiment, the information indicating the synchronization period may comprise information indicating the sequence number of the synchronization period in the sequence of synchronization periods set in advance.

Preferably, in the above first embodiment, the step of determining synchronization periods which have terminated before the time of scheduling based on the synchronization periods corresponding to the stored packets may comprise: determining, based on the sequence numbers of the synchronization periods corresponding to the stored packets, a synchronization period having the largest sequence number among the synchronization periods which have terminated before the time obtained by subtracting the predetermined estimate of delay from the time of scheduling, with the determined synchronization period and its preceding synchronization periods being the synchronization periods which have terminated before the time of scheduling.

An illustrative example will be further provided in the following with respect to the above preferred embodiments.

Figure 4:
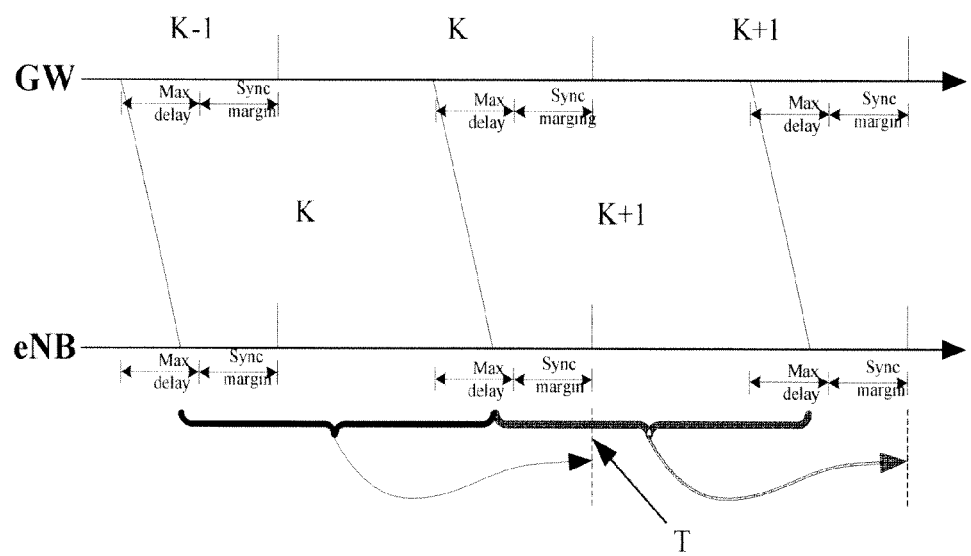
FIG. 4 is a schematic diagram illustrating the method for synchronizing between a gateway and a plurality of base stations according to the first embodiment of the present invention.

As shown in FIG. 4, if the current synchronization period is numbered K−1, the first packet in the burst arrives during the interval of [$T_{K-1}$−Max_delay−SYNC_margin, $T_K$−Max_delay−SYNC_margin], then the packet will be given a timestamp of K. Herein, $T_{K-1}$ is the start time of the synchronization period K−1, $T_k$ is the start time of the synchronization period K, Max_delay is the maximum delay of the network and SYNC_margin is a synchronization margin (typically set to be about 40 ms).

Although, as noted above, all the packets in a burst will be given the same timestamp, the base station can know which synchronization period a received packet belongs to from, for example, the "length of list" field contained in the packet. For example, if the timestamp is K−1 and the value of the "length of list" field in the received packet is 2, the base station can know that the packet belongs to synchronization period K.

As shown in FIG. 4, after determining the particular synchronization period to which the packet belongs, the base station starts scheduling the packet at the time of T which is not earlier than the particular synchronization period. In other words, the synchronization period indicates the earliest time when the packet could be processed by the base station.

The above example is intended for illustrative purpose only, rather than limiting the present invention.

Preferably, in the above first embodiment, when periodically scheduling data in the buffer, the base station can employ a scheduling period which equals to the synchronization period. Or, the synchronization period may be a multiple of the scheduling period.

Figure 5:
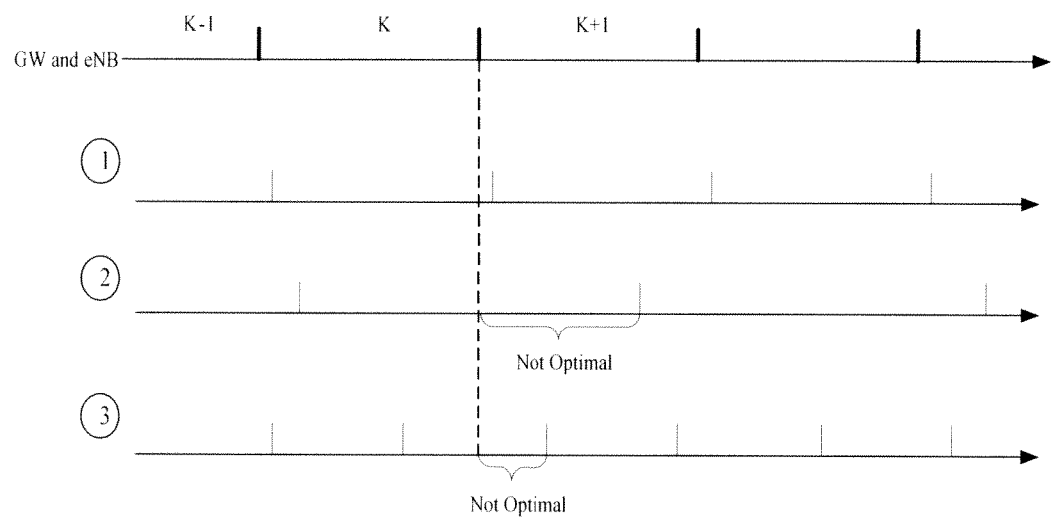
FIG. 5 is another schematic diagram illustrating the method for synchronizing between a gateway and a plurality of base stations according to the first embodiment of the present invention.

As shown in FIG. 5, for example, the first case illustrates the optimal situation in which the scheduling periods of the base station are approximately aligned with the synchronization periods K−1, K and K+1 (possibly with a small offset); the second case illustrates a non-optimal situation in which the scheduling period of the base station is not a multiple of the synchronization period and the synchronization period K undergoes a long delay; and the third case illustrates another non-optimal situation in which the scheduling period of the base station is not a multiple of the synchronization period.

Additionally, in the above example, preferably, the data not scheduled by the base station in a scheduling period can be incorporated into the next scheduling period for scheduling.

Preferably, in the above first embodiment, the method may further comprise the following steps of: at the gateway, pre-configuring information indicating the maximum allowable number of synchronization periods corresponding to each burst; and dividing, based on the information, a burst with a duration exceeding the maximum number of synchronization periods into two or more bursts. With this measure, it is possible to avoid an overlarge packet header and improper delay due to excessively long buffering time at the base station.

Preferably, in the above first embodiment, the method may further comprise the following steps of: at the gateway, constructing and transmitting a dummy packet without payload to the plurality of base stations if the packet to be transmitted to the plurality of base stations has not been received within a predetermined period; and at each of the plurality of base stations, determining, upon receipt of the packet, termination of the previously received burst based on the timestamp contained in the packet. With this measure, it is possible to inform the base station of the termination of the previous burst by transmitting from the gateway a dummy packet to the base station, if there is no subsequent packet or there is a packet lost.

Figure 6:
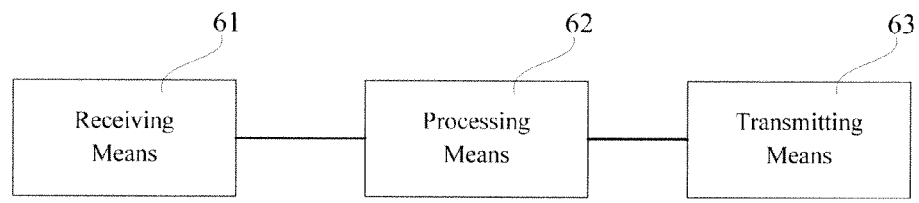
FIG. 6 is a schematic diagram illustrating the structure of the gateway according to the present invention.

According to another aspect of the present invention, a gateway is provided. Referring now to FIG. 6 which is a schematic diagram illustrating the structure of the gateway according to the embodiment of the present invention. As shown in FIG. 6, this gateway comprises: a receiving means 61 for receiving a packet to be transmitted to a plurality of base stations; a processing means 62 for determining a synchronization period corresponding to the packet received by the receiving means 61 and adding information indicating the synchronization period to the header of the packet, said synchronization period being used as a scheduling granularity of the base stations; and a transmitting means 63 for transmitting the packet processed by the processing means to the plurality of base stations.

Preferably, in the above embodiment, the gateway may further comprise: a setting means for setting a sequence of synchronization periods in advance based on the same time reference as that for the plurality of base stations.

Preferably, in the above embodiment, the processing means may add to the header of the packet a timestamp corresponding to the first packet in a burst to which the packet belongs and information identifying an accumulative count of the synchronization period to which the packet of the burst belongs and all of the previous synchronization periods of the same burst, wherein the timestamp indicates the synchronization period corresponding to the time at which the first packet is received.

Preferably, in the above embodiment, the gateway may further comprise a dividing means for dividing, based on pre-configured information indicating the maximum allowable number of synchronization periods corresponding to each burst, a burst received by the receiving means 61 and having a duration exceeding the maximum number of synchronization periods.

Preferably, in the above embodiment, the gateway may further comprise a dummy packet transmitting means for constructing and transmitting a dummy packet without payload to the plurality of base stations if the packet to be transmitted to the plurality of base stations has not been received within a predetermined period.

With the gateway according to the embodiment of the present invention, the synchronization between the respective service data received by the individual base stations can be maintained by changing the scheduling granularity. The problem with the prior art as stated above consists in that the scheduling granularity is too small, e.g., one data packet or one frame (10 ms), which tends to introduce uncertainty. With the gateway according to the embodiment of the present invention, a concept of synchronization period is introduced at both the gateway side and the base station side, such that both sides can determine the border of the received data to be scheduled based on the same synchronization period. In this way, the synchronization period can be used as the scheduling granularity, e.g., 320 ms, by the base station in subsequent processing. Thus, it is easier for the base station to determine sequential relationship in time and how many synchronization periods of data are received, so that the synchronization between the respective service data received by the individual base stations can be maintained and the requirements for service multiplexing and synchronization can be satisfied.

Figure 7:
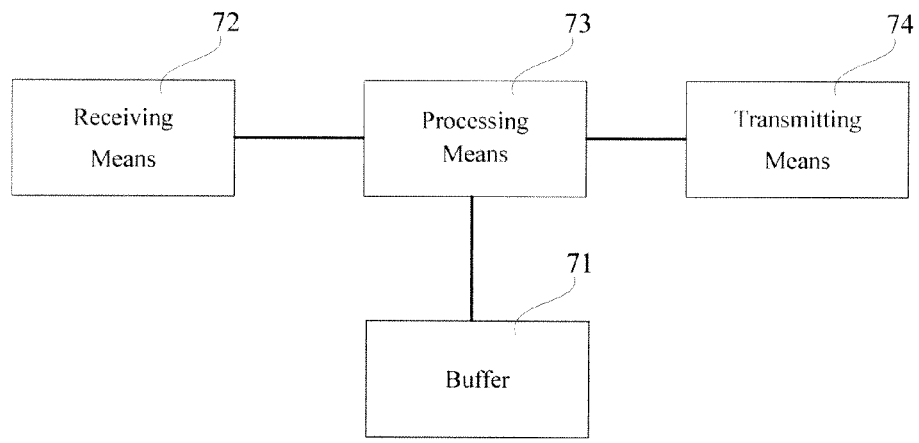
FIG. 7 is a schematic diagram illustrating the structure of the base station according to the present invention.

According a further aspect of the present invention, a base station is provided. FIG. 7 is a schematic diagram illustrating the structure of the base station according to the embodiment of the present invention. As shown in FIG. 7, this base station comprises: a buffer 71 for storing packets; a receiving means 72 for receiving packets from a gateway; a processing means 73 for obtaining synchronization periods corresponding to the packets received by the receiving means 72 based on information in the headers of the packets and storing the packets in the buffer 71; and a scheduling means 74 for determining, at the time of scheduling, synchronization periods which have terminated before the time of scheduling based on the synchronization periods corresponding to the packets stored in the buffer 71, and for scheduling and transmitting packets corresponding to the determined synchronization periods according to a predetermined scheduling strategy.

Preferably, in the above embodiment, the base station may further comprise a setting means for setting a sequence of synchronization periods in advance based on the same time reference as that for the gateway.

Preferably, in the above embodiment, the processing means may determine the synchronization period corresponding to the first packet in a burst to which the packet belongs based on a timestamp contained in the header of the packet and determine the synchronization period corresponding to the packet based on the determined synchronization period corresponding to the first packet and information contained in the header of the packet identifying an accumulative count of the synchronization period to which the packet in the burst belongs and all of the previous synchronization periods of the same burst.

Preferably, in the above embodiment, the scheduling means may determine, based on the sequence numbers of the synchronization periods corresponding to the stored packets, a synchronization period having the largest sequence number among the synchronization periods which have terminated before the time obtained by subtracting a predetermined estimate of delay from the time of scheduling, with the determined synchronization period and its preceding synchronization periods being the synchronization periods which have terminated before the time of scheduling.

Preferably, in the above embodiment, the scheduling means can clear all the data of the previous bursts stored in the buffer before scheduling a packet in a new burst.

With the base station according to the embodiment of the present invention, the synchronization between the respective service data received by the individual base stations can be maintained by changing the scheduling granularity. The problem with the prior art as stated above consists in that the scheduling granularity is too small, e.g., one data packet or one frame (10 ms), which tends to introduce uncertainty. With the base station according to the embodiment of the present invention, a concept of synchronization period is introduced at both the gateway side and the base station side, such that both sides can determine the border of the received data to be scheduled based on the same synchronization period. In this way, the respective service data can be scheduled by the individual base stations synchronously and the synchronization period can be used as the scheduling granularity for all base stations. Therefore, the synchronization between the respective service data received by the individual base stations can be guaranteed and the requirements for service multiplexing and synchronization can be satisfied.

What is claimed is:

1. A method for synchronizing between an access gateway and a plurality of base stations, said method comprising:
   at the gateway,
      determining a synchronization period corresponding to a packet to be transmitted to the plurality of base stations, said synchronization period being used as a scheduling granularity of the base stations,
      adding information indicating the synchronization period to the header of the packet, and
      transmitting the packet to the plurality of corresponding base stations; and at each of the plurality of base stations,
      obtaining, upon receipt of the packet, the synchronization period corresponding to the packet based on the information in the header of the packet,
      storing the packet in a buffer, determining, at the time of scheduling, synchronization periods which have terminated before the time of scheduling based on the synchronization periods corresponding to the stored packets, and scheduling packets corresponding to the determined synchronization periods according to a predetermined scheduling strategy.

2. The method according to claim 1, further comprising: setting, at the gateway and each of the plurality of base stations, a sequence of synchronization periods in advance based on the same time reference.

3. The method according to claim 2, wherein the adding information indicating the synchronization period comprises information indicating the sequence number of the synchronization period in the sequence of synchronization periods set in advance and wherein determining synchronization periods which have terminated before the time of scheduling based on the synchronization periods corresponding to the stored packets further comprises:

determining, based on the sequence numbers of the synchronization periods corresponding to the stored packets, a synchronization period having the largest sequence number among the synchronization periods which have terminated before the time obtained by subtracting the predetermined estimate of delay from the time of scheduling, with the determined synchronization period and its preceding synchronization periods being the synchronization periods which have terminated before the time of scheduling.

4. The method according to claim 1, wherein adding information indicating the synchronization period to the header of the packet further comprises:

adding, if the packet is the first packet in a burst, to the header of the packet a timestamp identifying the synchronization period corresponding to the time at which the packet is received and information identifying an accumulative count of the synchronization period to which the packet in the burst belongs and all of the previous synchronization periods of the same burst; or adding, if the packet is not the first packet in a burst, to the header of the packet a timestamp corresponding to the first packet in the burst to which the packet belongs and information identifying an accumulative count of the synchronization period to which the packet in the burst belongs and all of the previous synchronization periods of the same burst.

5. The method according to claim 4, wherein adding to the header of the packet a timestamp identifying the synchronization period corresponding to the time at which the packet is received futher comprises:

adding the time at which the packet is received and a predetermined estimate of delay;

determining a corresponding synchronization period based on the addition result; and adding to the header of the packet a timestamp identifying the determined synchronization period.

6. The method according to claim 4, wherein obtaining the synchronization period corresponding to the packet based on the information in the header of the packet futher comprises:

determining the synchronization period corresponding to the first packet in the burst to which the packet belongs, based on the timestamp contained in the header of the packet; and determining the synchronization period corresponding to the packet, based on the determined synchronization period corresponding to the first packet and the information contained in the header of the packet identifying the accumulative count of the synchronization periods corresponding to the burst.

7. The method according to claim 1, further comprising: at the gateway, constructing and transmitting a dummy packet without payload to the plurality of base stations if the packet to be transmitted to the plurality of base stations has not been received within a predetermined period; and at each of the plurality of base stations, determining, upon receipt of the packet, termination of the previously received burst based on the timestamp contained in the packet.

8. A gateway, comprising:

a receiver operative to receive a packet to be transmitted to a plurality of base stations;

a processor operative to process a synchronization period corresponding to the packet received by the receiver and add information indicating the synchronization period to the header of the packet, said synchronization period being used as a scheduling granularity of the base stations; and a transmitter operative to transmit the packet processed by the processor to the plurality of base stations.

9. The gateway according to claim 8, further comprising: a setting component that is operative to set a sequence of synchronization periods in advance based on the same time reference as that for the plurality of base stations.

10. The gateway according to claim 8, wherein the processor is further operative to add to the header of the packet a timestamp corresponding to the first packet in a burst to which the packet belongs and information identifying an accumulative count of the synchronization period to which the packet of the burst belongs and all of the previous synchronization periods of the same burst, wherein the timestamp indicates the synchronization period corresponding to the time at which the first packet is received.

11. The gateway according to claim 8, further comprising a dummy packet transmitter operative to construct and transmit a dummy packet without payload to the plurality of base stations if the packet to be transmitted to the plurality of base stations has not been received within a predetermined period.

12. A base station, comprising:

a buffer operative to store packets;

a receiver operative to receive packets from a gateway;

a processor operative to obtain synchronization periods corresponding to the packets received by the receiver means based on information in the headers of the packets and storing the packets in the buffer; and a scheduler operative to determine, at the time of scheduling, synchronization periods which have terminated before the time of scheduling based on the synchronization periods corresponding to the packets stored in the buffer, and for scheduling and transmitting packets corresponding to the determined synchronization periods according to a predetermined scheduling strategy.

13. The base station according to claim 12, further comprising a setting component that is operative to set a sequence of synchronization periods in advance based on the same time reference that for the gateway.

14. The base station according to claim 12, wherein the processor is further operative to determine the synchronization period corresponding to the first packet in a burst to which the packet belongs based on a timestamp contained in the header of the packet and determine the synchronization period corresponding to the packet based on the determined synchronization period corresponding to the first packet and information contained in the header of the packet identifying an accumulative count of the synchronization period to which the packet in the burst belongs and all of the previous synchronization periods of the same burst.

15. The base station according to claim 12, wherein the scheduler is further operative to determine, based on sequence numbers of the synchronization periods corresponding to the stored packets, a synchronization period having the largest sequence number among the synchronization periods which have terminated before the time obtained by subtracting a predetermined estimate of delay from the time of scheduling, with the determined synchronization period and its preceding synchronization periods being the synchronization periods which have terminated before the time of scheduling.

16. A method for synchronizing between an access gateway and a plurality of base stations, said method comprising:
receiving a packet to be transmitted to a plurality of base stations;
processing a synchronization period corresponding to the packet received by the receiver and adding information indicating the synchronization period to the header of the packet, said synchronization period being used as a scheduling granularity of the base stations; and
transmitting the packet processed by the processor to the plurality of base stations.

17. A method for synchronizing between an access gateway and a plurality of base stations, said method comprising:
receiving a packet from a gateway;
obtaining, upon receipt of the packet, the synchronization period corresponding to the packet based on the information in a header of the packet;
storing the packet in a buffer;
determining, at the time of scheduling, synchronization periods which have terminated before the time of scheduling based on the synchronization periods corresponding to the stored packets; and
scheduling and transmitting packets corresponding to the determined synchronization periods according to a predetermined scheduling strategy.

* * * * *